United States Patent

[11] 3,553,382

[72] Inventors Sidney G. Knox;
Richard N. Reynen, Oxnard, Calif.
[21] Appl. No. 658,504
[22] Filed Aug. 4, 1967
[45] Patented Jan. 5, 1971
[73] Assignees Edward R. Edelberg
a part interest;
Louis S. Edelberg
a part interest; Oscar Rothenberg, a part interest; Marvin R. Miller, Los Angeles, Calif., a part interest

[54] TOLL CALL SIGNALLING AND DIVERTING SYSTEM
4 Claims, 7 Drawing Figs.

[52] U.S. Cl. .......... 179/18, 179/81, 179/27
[51] Int. Cl. .......... H04m 1/66
[50] Field of Search .......... 179/18.19, 18.2, 18.3, 18REG., 81B, 81C, 27.021, 90R

[56] References Cited
UNITED STATES PATENTS

| | | | |
|---|---|---|---|
| 1,341,801 | 6/1920 | Heimann | 179/90(R) |
| 3,141,068 | 7/1964 | Cleary | 179/81(C) |
| 3,331,926 | 7/1967 | Largey | 179/18(.2) |

*Primary Examiner*—Ralph D. Blakeslee
*Attorney*—Bernard Kriegel

ABSTRACT: Apparatus adapted to be coupled to a telephone instrument for counting and storing the dial impulses of the initial digits of a number being dialed, and for applying the stored count to a gating circuit to determine if that call is a "toll" call. The gating circuit output can be used either to provide audible and/or visible signals, or can be utilized to interrupt the telephone circuits and prevent completion of the call. When used in conjunction with telephone instruments having more than one line for serving different calling areas, the gating circuit output can be used to signal if, for a given call, the "least expensive" line is being utilized.

PATENTED JAN 5 1971

3,553,382

SHEET 1 OF 3

Sidney G. Knox,
Richard N. Reynen,
INVENTORS.
BY.

Bernard Kriegel

ATTORNEY.

Sidney G. Knox,
Richard N. Reynen,
INVENTORS.
BY.
Bernard Kriegel
ATTORNEY.

Sidney G. Knox,
Richard N. Reynen,
INVENTORS.
BY.
Bernard Kriegel
ATTORNEY.

TOLL CALL SIGNALLING AND DIVERTING SYSTEM

BACKGROUND OF THE INVENTION

1. FIELD OF THE INVENTION

The present invention relates to telephone systems, and more particularly to apparatus for determining, prior to the completion of a telephone call, whether or not the proposed call falls within a limited group of "permissible" calls which are predetermined by the telephone subscriber.

Continued research and development improved telephone equipment has resulted in subscriber instruments which are now capable of "calling" virtually any other subscriber without the intervention of telephone company personnel. This achievement is not an unmixed blessing. There is generally no easy way for subscriber to know, when placing a call, whether it is a "toll-free" call or whether it is a "toll" call for his exchange. Further, many subscribers maintain more than one outgoing telephone line in different exchanges, having different toll-free areas. Many calls, which would be "toll" calls on one of the lines, are "toll-free" on the other line.

Moreover, the telephone companies have now provided "-Direct Distance Dialing," which subdivides the country into calling areas, each peculiarly identified by a numerical code combination prefix. If the "area code" is utilized in conjunction with a telephone number, a long distance call can be completed without the aid or assistance of telephone company personnel. It is, therefore, possible, through inadvertence or error, to call long distance areas without so intending.

Business subscribers with several outgoing telephone lines and many employees with access to these several lines have still other problems. Such a subscriber, in the interest of economy, would prefer that the telephone lines be used only to call local or toll-free calling areas, and that direct distance dialing be discouraged or, where possible, prevented.

2. Prior Art

This can easily be accomplished if the subscriber maintains telephone terminal equipment, including the stepping relays that are conveniently used to select the destination of calls. Such equipment is normally located only at the telephone company terminal installations, unless the subscriber has either a switchboard or internal, station-to-station calling capability. In either event, well known devices are available which can be connected to appropriate terminals of the stepping relays to prevent completion of "forbidden" calls, or which can connect the calling parties to an operator or a prerecorded message which indicates that the call is an "improper" one for the particular line.

SUMMARY It has been deemed desirable to have a compact, simple, recognition device which a subscriber may attach to his telephone instrument and which will, alternatively, prevent the completion of a forbidden call, or which will signal in distinctive fashion that a forbidden call is being attempted. Such a device would have great utility for the subscriber that maintains more than one telephone line to provide toll-free service to different calling areas. For those instances where, for the convenience of callers, an establishment maintains more than one line, such a device permits the calling party to take advantage of the toll-free number, if any, especially if the calling party is unsure of the toll-free number for his telephone.

According to the present invention, a decision matrix is provided, which, in combination with electrical counters, receives and stores the initial digits of a telephone call as they are dialed. These digit combinations are compared in the matrix against preselected forbidden combination, which can, for instance, represent toll calls from the instrument. In one embodiment of the invention, useful in an installation having two telephone lines, all telephone calls within the area are toll-free for one or the other of the lines. The decision matrix can provide a single output signal, which signals "permissible" calls on one of the telephone circuits and toll calls on the other. A simple inverting circuit then can provide, at all times, a pair of complementary signals. By including apparatus responsive to which of the telephone lines was selected for the placement of the call, the present invention provides either a signal or physically disconnects the circuit in the event that a forbidden number has been dialed for a particular telephone line.

In alternative embodiments, the decision matrix can provide signals representing not only forbidden combinations for each of the telephone lines, but also forbidden combinations for all of the telephone lines. This embodiment is useful if Direct Distance Dialing or calls to the "Long Distance Operator" are to be discouraged or prevented.

Conventional digital computer type circuits can be used to construct apparatus according to the present invention. More particularly, counters, such as flip-flop or ring counters, may be used in conjunction with dial-type telephone instruments to count and store the impulses corresponding to the digit dialed. A single count storage device may be adequate in a very simple telephone system. In most embodiments however, at least the first two digits corresponding to the "prefix" are necessary to ascertain the "area" to which the call has been directed. In larger metropolitan areas, it may be necessary to utilize a third number storage counter, since toll-free and toll areas may differ only by the third digit. Three digits will also recognize "area codes" for long distance calls, as opposed to local calling prefixes.

It is also possible, by suitable interconnection of the decision matrix, for a subscriber to select any arbitrary group of numbers as "acceptable" and to designate all others as forbidden. If multiple lines are available, some numbers can be selected as "conditionally acceptable," only if called on the appropriate line, while other numbers can be forbidden to all lines.

While, in the preferred embodiment, the telephone circuits are physically disconnected temporarily to prevent the completion of a forbidden call, in other embodiments, a visible or audible signal can be provided to warn the calling party that a forbidden call is being placed.

This invention possesses many other advantages, and has other purposes which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

BRIEF DESCRIPTION OF THE DRAWINGS

Referring to the drawings.

DESCRIPTION OF THE PREFERRED EMBODIMENTS

Figure 1:
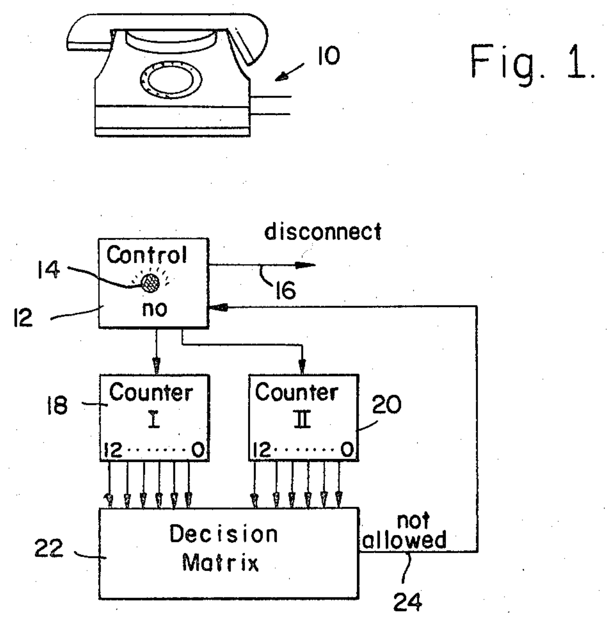
FIG. 1 is a block diagram of a toll call signalling and diverting system according to the present invention.

In FIG. 1, there is shown in representational form a block diagram of a system, according to the present invention, which is adapted for use with a typical telephone instrument 10. As is shown, a control box 12 is provided with a signal light 14 and with an output lead 16, which is adapted to connect to suitable disconnect circuits which temporarily open the telephone line, thus preventing the completion of a call.

The control circuits 12 also include dial pulse recognizing and signal pulse generating circuits, which are applied to first and second counters 18, 20, the outputs of which are applied to a decision matrix 22. The output of the decision matrix may be termed a not allowed signal line 24, which is then applied to the control circuit 12, for illuminating the signal lamp 14 and energizing the disconnect line 16. Obviously, if the call is a permitted one, the not allowed line 24 would not be energized and the call could proceed in normal fashion.

Figure 2:
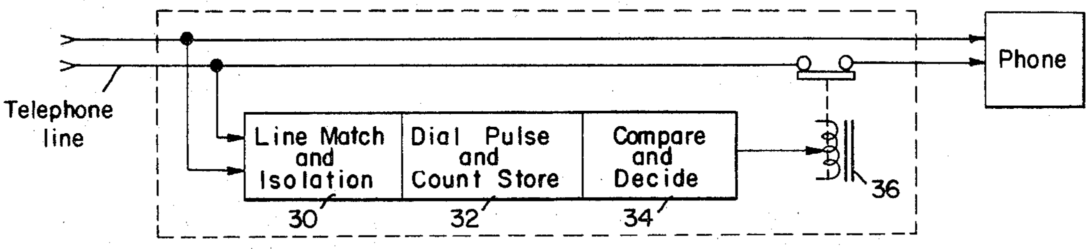
FIG. 2 is a block diagram of the main subcircuits of the present invention.

In FIG. 2, there is a block diagram of the elements of a system, according to the present invention, which typically include a line match and isolation portion 30, a dial pulse count and store element 32, compare and decide circuits 34, and, as shown, a disconnect relay 36 which interrupts the telephone circuits upon the provision provision of an appropriate signal from the compare and decide circuits 34.

Figure 3:
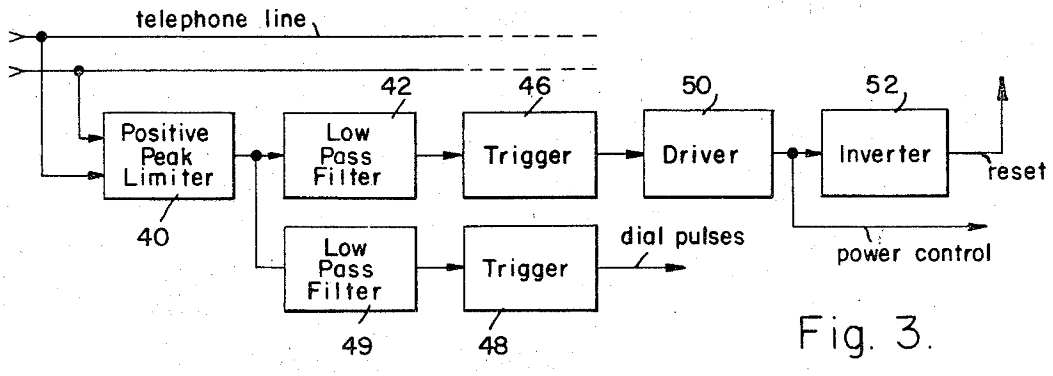
FIG. 3 is a block diagram of the circuits of the present invention.

FIG. 3 sets forth, in somewhat greater detail, the component elements of the portions of the line match and isolation circuits 30, which generate controlling signal for the remaining part of the system. As shown, a connection is made through telephone lines, which may be either direct or inductive, depending upon whether or not the apparatus may be attached to the telephone line under the appropriate tariffs regulating the telephone service.

The signal derived from the operation of the telephone dial are passed through a positive peak limiter 40 which applies signals to a pair of low pass filters 42, 49. The outputs of the filters 42, 49 are respectively applied to a pair of trigger circuits 46, 48, one of which provides the "dial pulse" signal to the remainder of the circuit, and the other of which energizes a driver circuit 50. The driver circuit 50 applies its output to power the remaining elements of the system, and an inverter 52 provides a reset impulse to the circuits to be described below.

In operation, the manipulation of the dial generates a series of interrupted signals, which are detected and utilized in the trigger circuits 46, 48, to generate pulses of predetermined polarity, amplitude and duration to the remaining circuits of the system. So long as the dial is being operated, the driver circuit 50 is adapted to provide a signal for a reasonably long period of time to cover a delay in the dialing of a subsequent digit after a first digit is dialed. When the driver 50 fails to provide a signal, such as when dialing has been completed, or before dialing has commenced, the inverter 52 provides an output signal which is utilized to reset the system, as will be explained in greater detail in connection with the FIGS. below.

Figure 4:
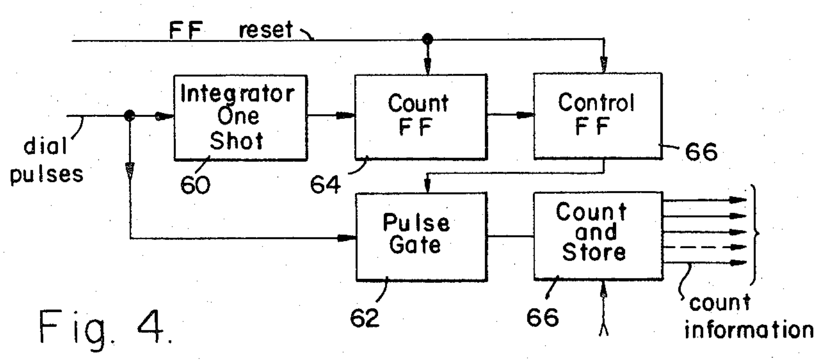
FIG. 4 is a block diagram of the pulse counting and storing circuits of FIG. 2.

In FIG. 4, there is shown a preferred arrangement of computer type elements for counting and storing signals representing dialed pulses. The dial pulses produced by the trigger circuit 48 are applied to an integrator one shot 60 and to a pulse gate 62. The integrator one shot 60 output is applied to the set terminal of a count flip-flop 64, the reset terminal of which is connected to the reset line from the inverter 52. The circuits of FIG. 4 control the count and storage of one of the dialed digits, and, in some embodiments, may be adequate to determine whether or not the call being attempted is to a forbidden number. The 1 output of the count flip-flop 64 is applied to a control flip-flop 66, the output of which is applied to and enables the pulse gate 62. As the line is connected by lifting the hand set, and initial pulse, which is not to be "counted," sets the count and control flip-flops 64, 66, but is not passed by the pulse gate 62. When energized by the control flip-flop 66, the pulse gate 62 permits dialed pulses to be applied to a count and store circuit 66 which provides on one of a plurality of output lines a signal representing the digit dialed. Alternatively, fewer lines could be used if the digit is represented in an appropriate code, such as binary, binary coded decimal, or other code.

Figure 5:
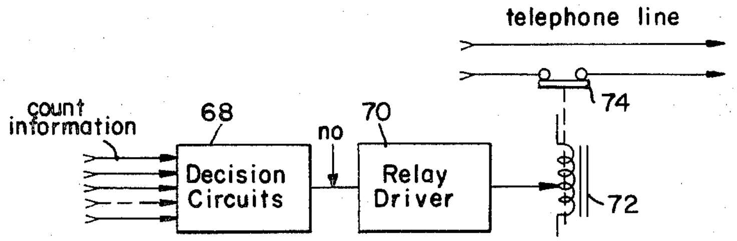
FIG. 5 is a block diagram of the compare and decide circuits of FIG. 2.

In FIG. 5, the decision circuit 68 output is applied to a relay driver 70, in the preferred embodiment. As shown, a relay 72 has a switch 74 across the telephone line, and, when energized, "open circuits" the telephone line. A second switch could be provided to energize a signal lamp or generate an audible tone. Well known circuits can respond to a momentary switch closure to provide a visible or audible signal for a predetermined time interval, which would inform the caller that the call is a forbidden one and has been terminated.

Figure 6:
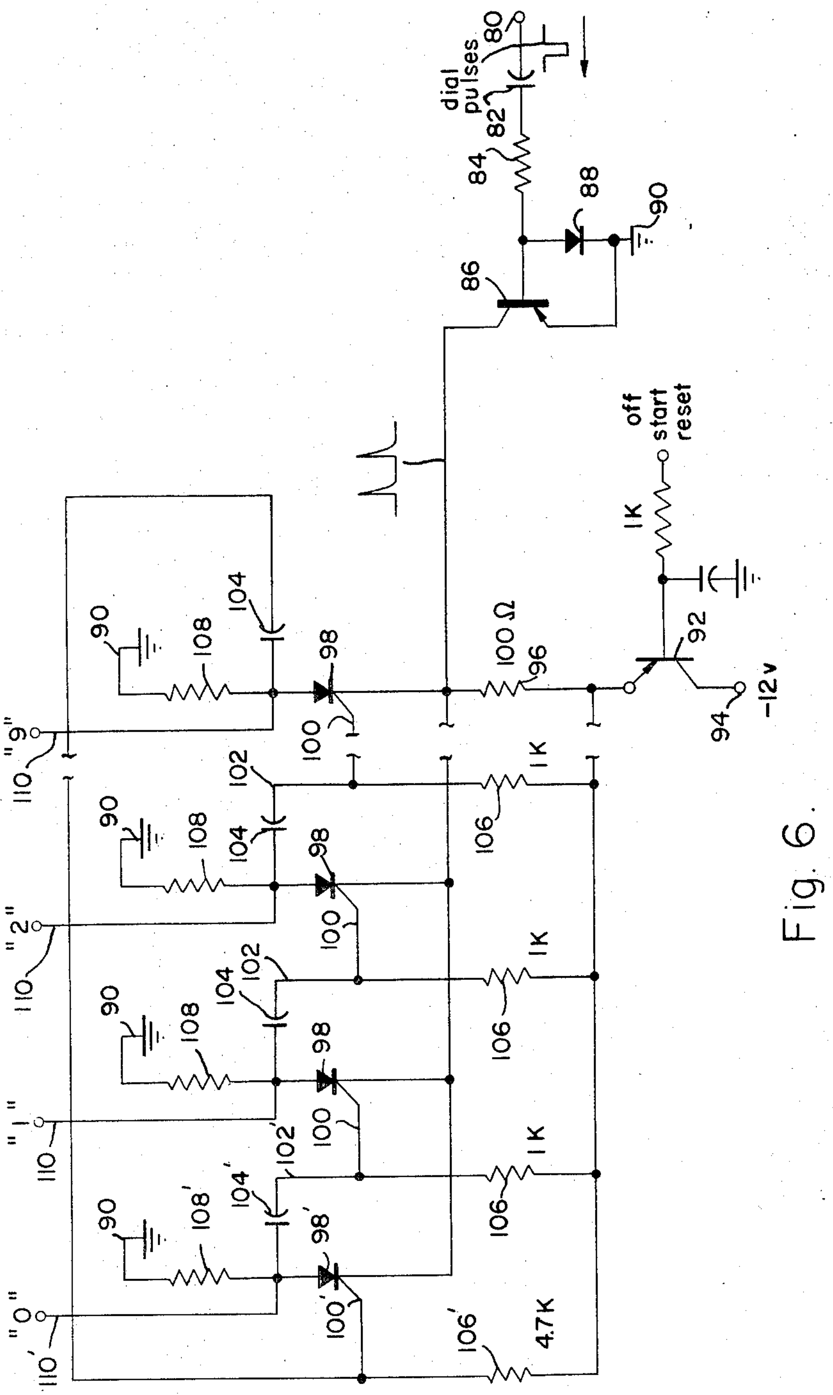
FIG. 6 is a circuit diagram of an SCR counting ring useful in the preferred embodiment.

In FIG. 6, a typical counter circuit is set forth, which utilizes silicon controlled rectifiers or SCRs, arranged in a counting ring, and which may be utilized as counter 18 in FIG. 1. As shown, dial pulses which are applied to an input terminal 80 are transmitted through a coupling capacitor 82 and a limiting resistor 84 to the base of a transistor 86. The transistor base is clamped through a clamping diode 88 to a common reference potential indicated by the conventional ground symbol 90. The transistor 86 is connected as a switch between ground 90 and the cathodes of all of the SCRs of the ring.

A second or control transistor 92 has its emitter connected to a source of relatively negative potential 94. The base of the second transistor 92 is connected to receive an energizing input from appropriate control circuits so that the SCR ring is energized only when dialing commences. The relatively negative potential 94 is applied through the transistor 92 and a cathode resistor 96 to a point commonly connecting all of the SCR 98 cathodes of the chain. The gate terminal 100 of each of the SCRs 98 is connected to a cross-coupling circuit 102, which includes a coupling capacitor 104 between the gate electrode 100 and the anode of the "preceding" stage SCR on the one side, and through a bias resistor 106 to the emitter of the second transistor 92.

One of the SCR devices $98^1$ is designated the 0 count SCR of the ring, and the elements associated therewith have been identified with primed reference characters. The bias primed $106^1$ has a substantially greater value than the bias resistor 106 of the remaining SCRs 98. Each of the SCRs 98, $98^1$ is provided with an anode resistor 108, $108^1$ which returns the SCR anode to ground. A plurality of output terminals 110, $110^1$ are provided, which are respectively designated 0 through 9, to represent the ten possible states of a ring counter corresponding to the digits dialed.

In operation, when dialing commences, the second transistor 92 is energized and a negative potential is applied to all of the cathodes of the SCRs 98, $98^1$. At the same time, a bias is applied to the gate electrodes through the identical resistors 106. A different bias is applied to the first SCR $98^1$ due to the greater resistance of the resistor $106^1$. This bias difference is generally sufficient to trigger initially the first SCR $98^1$ into conduction. The potential at the anode then drops to some relatively negative value, which, when appearing at the output terminal $110^1$, signals that it is the first SCR $98^1$ that is conducting.

As each dial pulse is applied to the input terminal 80, the first transistor 86 is temporarily rendered conductive, applying the ground potential to the cathodes of all the SCRs. The nonconducting SCRs are not affected by this application of the ground potential. However, the SCR that is conducting, for example, the first SCR $98^1$ is rendered nonconducting, since th; cathode has been raised to the cathode potential of the anode, terminating conduction. The anode potential then rises to ground at a rate partly determined by the coupling capacitor 104. This positive-going "transient" is applied to the gate 100 of the adjacent or 1 representing SCR 98, rendering it conductive, the cathode potential having returned to the relatively negative value. The anode potential drop applies a negative-going spike to the gate electrode of the succeeding stage, but this has no effect on a nonconducting SCR.

Similarly, as additional dial pulses are applied to the terminal 80, conduction is transferred from SCR to SCR within the chain. As is noted, the 9 representing SCR 98 is also cross-coupled to the 0 representing SCR $98^1$ to cover the contingency of a 0 being dialed representing ten impulses. The output of the ring is represented by the one of the output terminals 110 that is at the relatively negative potential, rather than the ground potential.

If two digits are needed to determine whether a call is forbidden, a second, substantially identical counter is provided.

Figure 7:
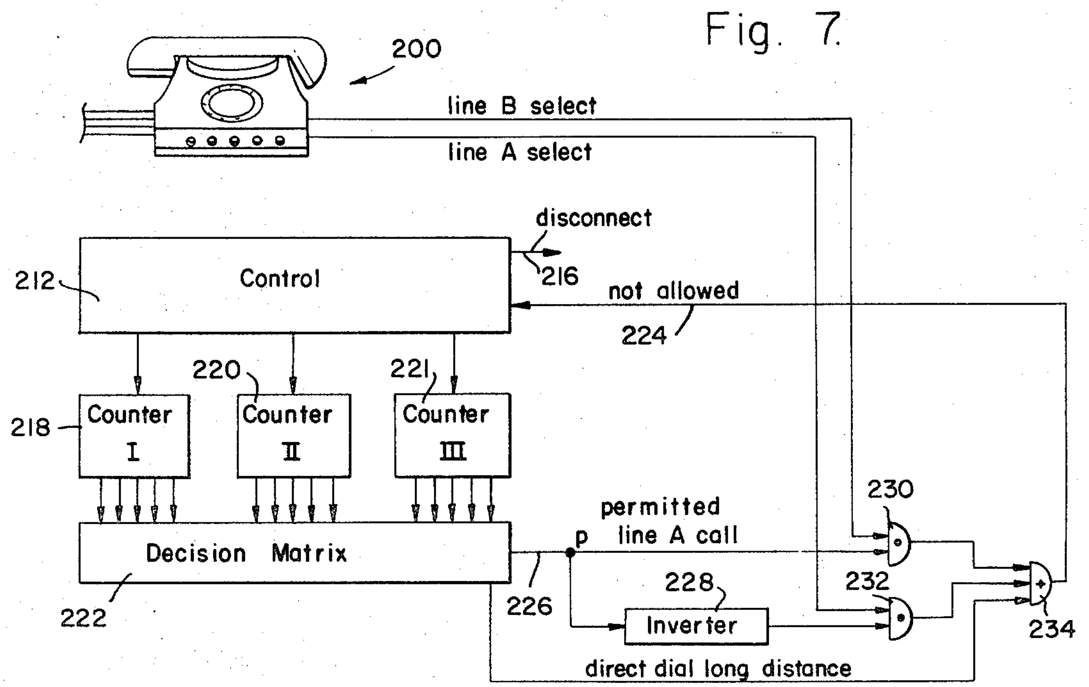
FIG. 7 is a block diagram of an embodiment of the present invention useful in areas where two telephone lines include, as between them, all local calls in a given calling area.

Turning now to FIG. 7, there is shown a similar system, which is adapted for use with a telephone instrument 200 having more than one line for calling. For purposes of illustration, assume that the service area is such that all telephone exchanges are "local" calls for one of two lines A and B, and that the first three digits of a telephone number are necessary to distinguish local from toll calls. In the present example, assume also that directly dialed long distance calls are also to be discouraged.

A system including a control unit 212 similar to that of FIG. 1 embodies the elements of FIGS. 2 and 3. The circuit of FIG. 4 are also usable, except that the count and store 66 portion is expanded, as indicated in FIG. 7, to include, in addition to counter I 218 and counter II 220, a third counting element, counter III 221, the outputs of which are applied to a decision matrix matrix 222.

As in FIG. 1, the control unit 212 generates a disconnect signal on disconnect line 216 in response to a not allowed signal on decision line 224 from the decision matrix 222. The decision matrix 222, in the present embodiment, provides on an output line 226 a first output signal, designated, for convenience, a "permitted line A call," which is generated after the first three digits are dialed, if these digits represent a line A local call. The permitted line A call signal is applied to an Inverter 228 and to one input of a first, two input AND gate 230. The output of the Inverter 228 is applied to one input of a second, two input AND gate 232. A "line B select" signal, derived from the telephone instrument 200, is applied to the second input of the first AND gate 230, and a "line A select"-signal, similarly derived, is applied to the second input of the second AND gate 232. The outputs of both AND gates 230, 232 are applied to two of the three inputs of an OR gate 234, the output of which is applied to the "not allowed" signal line 224 which is connected to the control circuit 212. A third input, representing the recognition of a directly dialed long distance call, is applied by the decision matrix 222.

In the present example, all calls requiring more than one digit for completion can be classified as line A local, line B local, or long distance. A not permitted line A call is not necessarily a permitted line B call, and accordingly, the separate recognition of direct distance dialing and other special combinations is necessary. If a line A local call is incorrectly placed on placed B, the permitted line A signal would not be provided and inverter 228 would provide a signal corresponding to a permitted line B call. The line A select signal applied to the second AND gate 232 permits a signal to be applied through the OR gate 234, which is the "not allowed" signal that results in an energization of the line disconnect output 216. If line B was selected, the second AND gate would be disabled and no "not allowed" signal would be generated.

We claim:

1. In combination with a telephone system and a telephone instrument alternatively connectable to first and second telephone service areas, wherein predetermined calling codes represent toll calls in one of the service areas and toll-free calls in the other of the service areas, apparatus to prevent toll calls from the instrument comprising:

a. count storage means coupled to the telephone instrument for storing signals representing the digits of the calling codes representing telephone service areas being dialed;

b. comparison matrix means connected to said count storage means and operable in response to stored signals for generating first signals representing permitted calling codes for the first telephone service area and second signals representing permitted calling codes for the second telephone service area;

c. signalling means connected to the telephone instrument and said comparison matrix means for signalling forbidden combinations in response to first signals when the instrument is connected to the second telephone area, and in response to second signals when the instrument is connected to the first telephone area.

2. Apparatus of claim 1 above, further including disconnect means connected to said signalling means and the telephone instrument, operable in response to said forbidden combination signals to disconnect the instrument from the telephone system.

3. Apparatus of claim 1 above, further including alarm means connected to said signalling means for providing audible and visible alarms in response to applied forbidden combination signals.

4. For use with a telephone system in which two exchanges are sufficient to provide toll-free calling of other local exchanges within the calling area, the combination with the telephone system including a telephone instrument alternatively connectable to each of the two exchanges; of a toll call signalling device comprising:

a. dial impulse recognizing means coupled to the instrument for converting each digit dialed into a stored electrical signal of numerical significance corresponding to the digit dialed;

b. comparison means connected to said recognizing means for signalling predetermined correspondence between stored electrical signals corresponding to digits dialed and digit combinations representing toll calls for only one of the two exchanges; and c. alarm means coupled to the telephone instrument and connected to said comparison means for generating an alarm signal in response to signals representing connection to a one of the telephone lines and comparison means signals representing a toll call for that telephone line, and to signals representing connections to the other of the telephone lines and the absence of comparison means signals representing a toll call.